(12) United States Patent
Haubold

(10) Patent No.: US 11,725,754 B1
(45) Date of Patent: Aug. 15, 2023

(54) COMPOSITE PIPE AND TUBING MANUFACTURING PROCESS

(71) Applicant: Caluz, LLC, Miami Beach, FL (US)

(72) Inventor: Alberto Carbi Haubold, Miami Beach, FL (US)

(73) Assignee: Javier A. Carbi, Miami Springs, FL (US)

( * ) Notice: Subject to any disclaimer, the term of this patent is extended or adjusted under 35 U.S.C. 154(b) by 0 days.

(21) Appl. No.: 17/202,709

(22) Filed: Mar. 16, 2021

Related U.S. Application Data

(60) Continuation of application No. 16/172,304, filed on Oct. 26, 2018, now abandoned, which is a division of application No. 14/851,850, filed on Sep. 11, 2015, now abandoned.

(51) Int. Cl.
*F16L 9/14* (2006.01)

(52) U.S. Cl.
CPC ...................... *F16L 9/14* (2013.01)

(58) Field of Classification Search
CPC . B29C 66/61; B29C 69/008; B29C 66/72523; B29C 66/54; B29C 66/536; B29C 66/52272; B29C 66/52271; B29C 66/5227; B29C 66/52211; B29C 66/522; B29C 66/52; B29C 66/51; B29C 66/50; B29C 66/49; B29C 65/78; B29C 2045/1719; B29C 45/14622; B29C 45/14614
See application file for complete search history.

(56) References Cited

U.S. PATENT DOCUMENTS

| | | | |
|---|---|---|---|
| 3,041,204 A | 6/1962 | Green | |
| 3,563,889 A | 2/1971 | Cooper, IV et al. | |
| 4,716,053 A | 12/1987 | Eskijian | |
| 5,265,648 A * | 11/1993 | Lyon | F16L 55/1653 264/269 |
| 5,948,343 A | 9/1999 | Hiroki et al. | |
| 7,744,974 B2 | 6/2010 | Pearson et al. | |
| 8,002,926 B2 | 8/2011 | Graham | |
| 8,591,788 B2 | 11/2013 | Dagher et al. | |
| 8,935,888 B2 | 1/2015 | Dagher et al. | |
| 2003/0178082 A1 | 9/2003 | Yamaguchi et al. | |
| 2004/0145091 A1 | 7/2004 | Willig et al. | |
| 2010/0051182 A1 | 3/2010 | Graham | |

\* cited by examiner

*Primary Examiner* — Stella K Yi
(74) *Attorney, Agent, or Firm* — Dale Paul DiMaggio, Esq.; Malin Haley DiMaggio & Bowen, P.A.

(57) ABSTRACT

A method for manufacturing composite tubing, conduit, pipes, and piping. The method includes providing an inner sleeve, an outer sleeve, and a reinforcement sleeve; inserting the inner sleeve into the reinforcement sleeve; placing the outer sleeve around the reinforcement sleeve; inserting a first piston into an inlet end of the inner sleeve; introducing resin between the inner and outer sleeves; inserting a second piston into the inlet end of the inner sleeve; applying motive fluid pressure, such as air pressure, at the inlet end of the inner sleeve, causing the second piston to translate along the inner sleeve, further causing the first piston to translate along the inner sleeve; whereby translation of the first and second pistons along the inner sleeve causes the resin to be impregnated into and around the reinforcement sleeve, resulting a composite final product. The impregnated reinforcement sleeve is then cured.

10 Claims, 8 Drawing Sheets

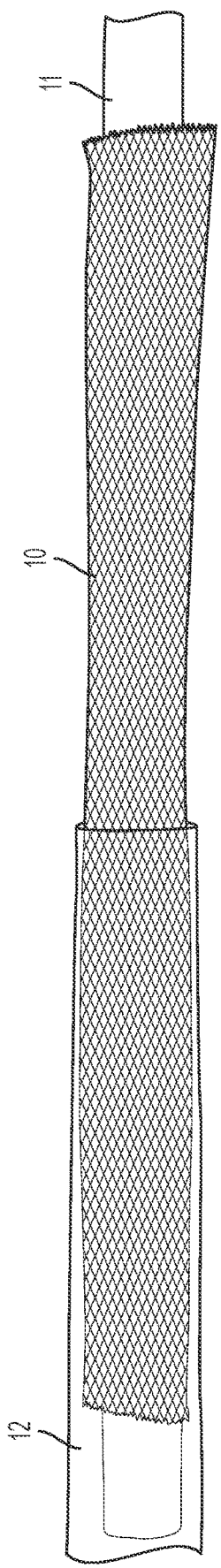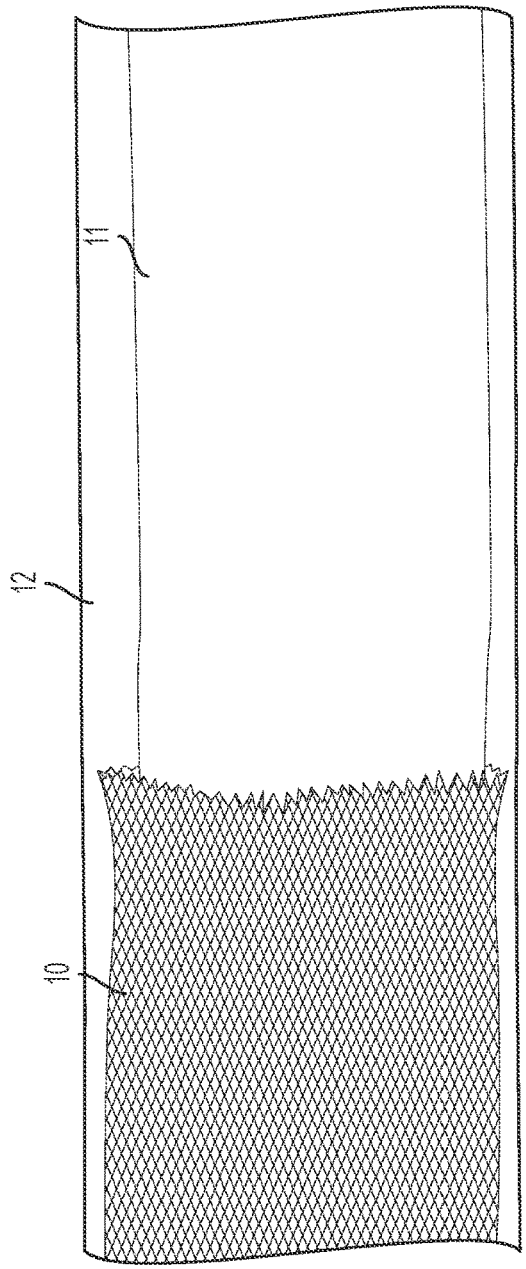
FIG. 1C
FIG. 1D

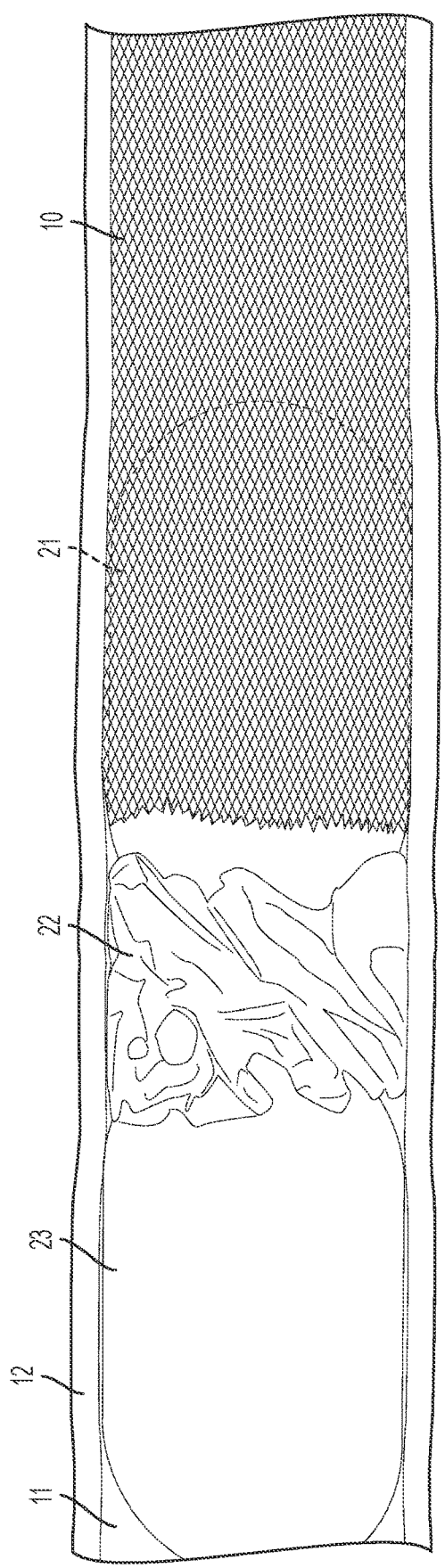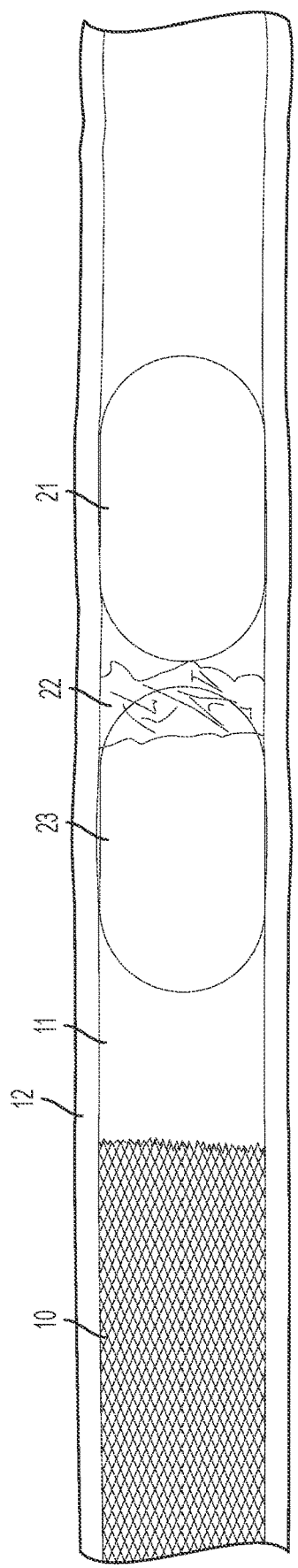

COMPOSITE PIPE AND TUBING MANUFACTURING PROCESS

BACKGROUND OF THE INVENTION

Claim of Priority

This present Continuation U.S. Patent Application claims priority to the U.S. patent application Ser. No. 16/172,304, which is a divisional continuation of U.S. patent application Ser. No. 14/851,850, filed on Sep. 11, 2015, now abandoned, all the contents of which are incorporated herein by reference in their entirety.

Field of the Invention

The present invention generally relates to methods and manufacturing processes for composite pipe and tubing.

DESCRIPTION OF THE RELATED ART

Composite materials such as fiberglass for conduits, piping, and tubing have significant advantages over traditional copper or PVC (poly-vinyl-chloride) materials when used in conduit, piping, and applications. Typically, such composite materials are less susceptible to corrosion and are easier to fit and install. However, there traditionally has been some difficulty in manufacturing composite tubing and pipes as compared to PVC and copper, which are typically manufactured through injection molding or extrusion methods. The manufacturing difficulties arise because composite materials such as fiberglass require the application of a curing resin to a generally flexible fibrous material, thus requiring substantial development into molds, curing bays, resin applicators and the like. The instant invention is directed at an enhanced method of manufacturing and process for manufacturing tubing and pipe from composite materials that overcomes the traditional hurdles while assuring a uniform, strong, and stable final product.

Several attempts have been made at providing methods of manufacturing composite tubing, however none have adequately addressed all of the manufacturing problems. For example, U.S. Patent Application Publication 2004/0145091 to Willig et al. relates to a composite urethane pipe manufacturing method. The reinforced urethane product, for example a pipe section, is formed by providing a braided sock formed from a fiber material such as carbon fiber, and supporting the braided sock along a mandrel. A sizing compound is applied to the exterior of the material to stiffen the sock such that it maintains its desired shape for further processing within a mold. Once within the mold, it is heated and a supply of mixed liquid urethane is poured into the open interior. A supply of positive pressure can be connected to the enclosed mold to force the urethane in the braided sock outward toward the inner wall of the mold, the urethane penetrating the fibers of the braided sock.

U.S. Pat. No. 8,935,888 to Dagher et al., describes a composite structural member and method of manufacturing. This reference describes an inflatable mold assembly which includes a tubular inflatable bladder, a reinforcing fabric which is a flexible layer, and an air-impervious outer layer. An interior wall of the inflatable bladder defines the elongated inflatable cavity. The reinforcing flexible fabric layer is positioned concentrically around the inflatable bladder, and the air impervious outer layer is positioned concentrically around the flexible fabric layer which defines elongated interstitial spaces between the flexible layer and the inflatable bladder, with the flexible layer being positioned within the space. Air is directed into the internal cavity of the inflatable bladder, and a fluid rigidification application material such as resin is pumped through a port which infuses the flexible fabric layer.

U.S. Pat. No. 8,002,926 to Graham illustrates a system for producing composite tubes from fiber reinforced composite materials. And elongated hollow mandrel is utilized, and the reinforcing material is wrapped around the mandrel. A fluid flow method and structure is utilized to enable heat transfer fluids of different temperatures to be circulated within the mandrel cavity, causing heat to be transferred from the fluid, through the mandrel, to the composite lay-up for curing or forming.

U.S. Pat. No. 3,041,204 to Green describes a method for coating the interior of a conduit or pipe by moving a body of liquid or semi-fluid coating material axially along the conduit while it is contained between two pairs of deformable spheres. The spheres are pushed through the conduit by air such that the coating material is moved along the inner face of the conduit, the volume of coating material held between the spheres gradually diminishing as it is spread along the pipe until the two pairs of compacting spheres approach each other within the conduit.

It is, therefore, to the effective resolution of the aforementioned problems and shortcomings of the prior art that the present invention is directed. However, in view of manufacturing processes in existence at the time of the present invention, it was not obvious to those persons of ordinary skill in the pertinent art as to how the identified needs could be fulfilled in an advantageous manner.

SUMMARY OF THE INVENTION

Disclosed herein are various embodiments of a method for manufacturing composite tubing, conduit, pipes, and piping. In some embodiments, the method comprises the steps of providing an inner sleeve, an outer sleeve, and a reinforcement sleeve; inserting the inner sleeve into the reinforcement sleeve; placing the outer sleeve around the reinforcement sleeve; inserting a first piston into an inlet end of the inner sleeve; introducing resin between the inner and outer sleeves; inserting a second piston into the inlet end of the inner sleeve; applying motive fluid pressure, such as air pressure, at said inlet end of said inner sleeve, causing the second piston to translate along the inner sleeve, further causing the first piston to translate along the inner sleeve; whereby translation of the first and second pistons along the inner sleeve causes the resin to be impregnated into and around the reinforcement sleeve, resulting in a composite final product.

In some embodiments, the method further includes the step of continuing to apply motive fluid pressure at the inlet end of the inner sleeve until the first and second pistons pass an outlet end of the inner sleeve, beyond the reinforcement sleeve. In some embodiments, the method further includes the step of, after the first and second pistons pass the outlet end of the inner sleeve, clamping the inner and outer sleeves to retain pressure inside the inner sleeve. In some embodiments, the method further includes the step of curing the resin and the reinforcement sleeve to form the composite final product. Curing may be carried out by applying heat to the arrangement. In some embodiments, the pistons are generally spherical elastic members that can deform. Further, in some embodiments, a rigid mold can be utilized, by inserting the outer-inner-reinforcement sleeve arrangement therein to form a final product of any desired shape and/or dimensions.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1C shows a step of the present method wherein the outer forming sleeve is placed over the reinforcement sleeve and inner forming sleeve.

FIG. 1D is a close up of the arrangement of the sleeves in accordance with the present method.

FIG. 2C shows a step of the present method wherein resin is inserted between the outer and inner forming sleeves and a second piston is inserted into the inner forming sleeve.

FIG. 2D shows a step of the present method wherein fluid pressure is applied at one end of the arrangement, causing the pistons to translate along the inner sleeve and distribute the resin to the reinforcement sleeve.

Like reference numerals refer to like parts throughout the several views of the drawings.

DETAILED DESCRIPTION OF THE PREFERRED EMBODIMENT

Figure 1A:
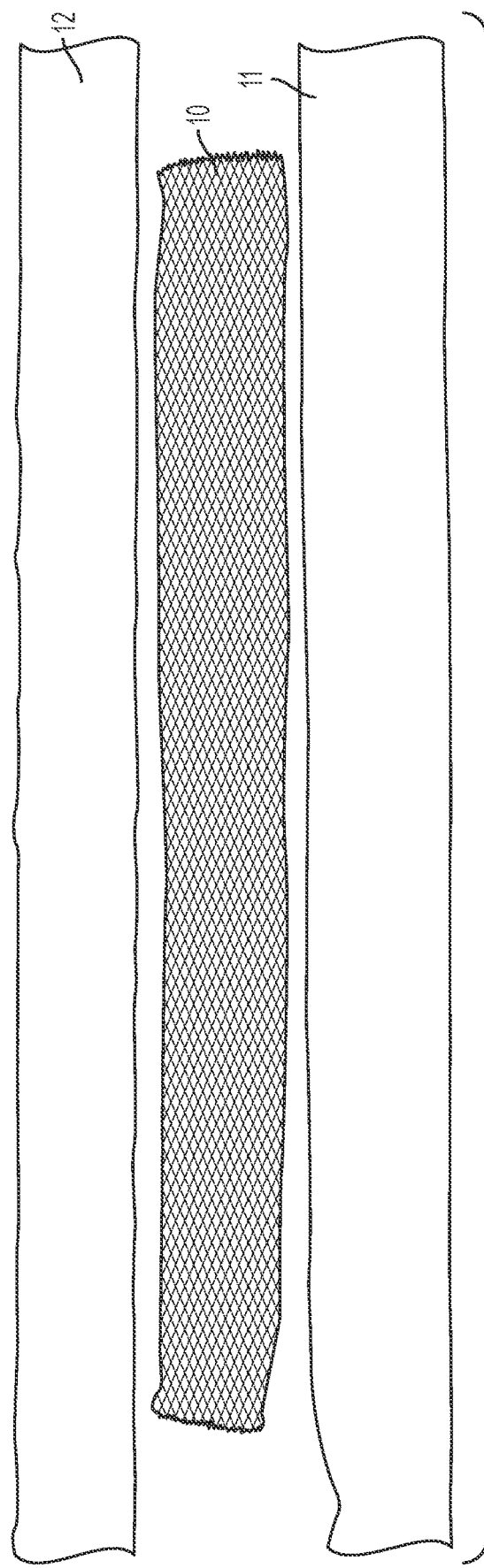
FIG. 1A is perspective view of the components used in the present method, including forming sleeves, and a reinforcement sleeve.

The present invention is a method of manufacturing and process for manufacturing composite-reinforced tubing or piping of any size that can be either or straight or curved, and that may include a variable internal wall thickness at any desired location, based upon precise and constant resin impregnation. With reference to FIG. 1A, the resin impregnation of the reinforcement sleeve 10 occurs between two concentric forming sleeves 11 and 12 of which the inner sleeve 11 comprises flexible and/or elastic material and the outer sleeve 12 may be rigid or flexible. In some embodiments, the outer sleeve 12 is optionally elastic.

Figure 1B:
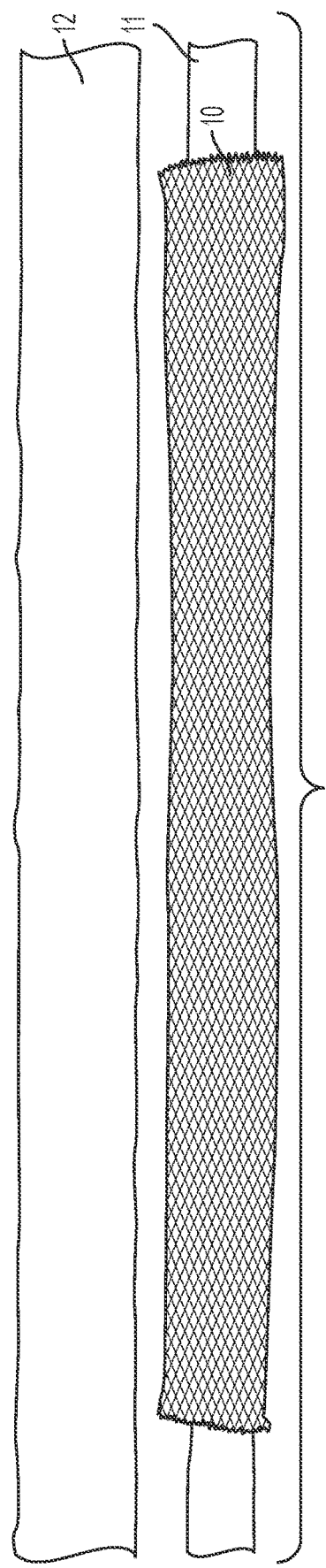
FIG. 1B shows a step of the present method wherein the inner forming sleeve is inserted into the reinforcement sleeve.
Figure 1E:
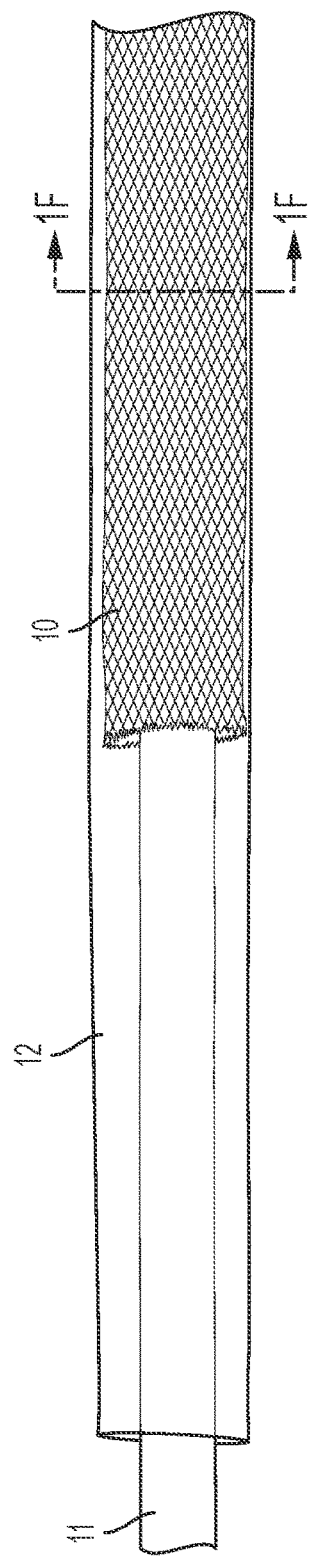
FIG. 1E shows one example of the final placement of the outer sleeve over the reinforcement sleeve and inner sleeve.
Figure 1F:
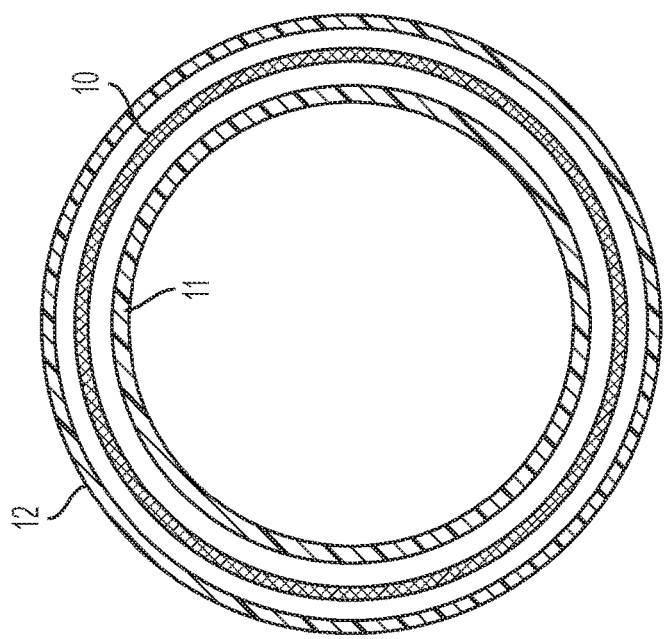
FIG. 1F is a cross section of the arrangement of the outer sleeve, reinforcement sleeve, and inner sleeve.
Figure 1G:
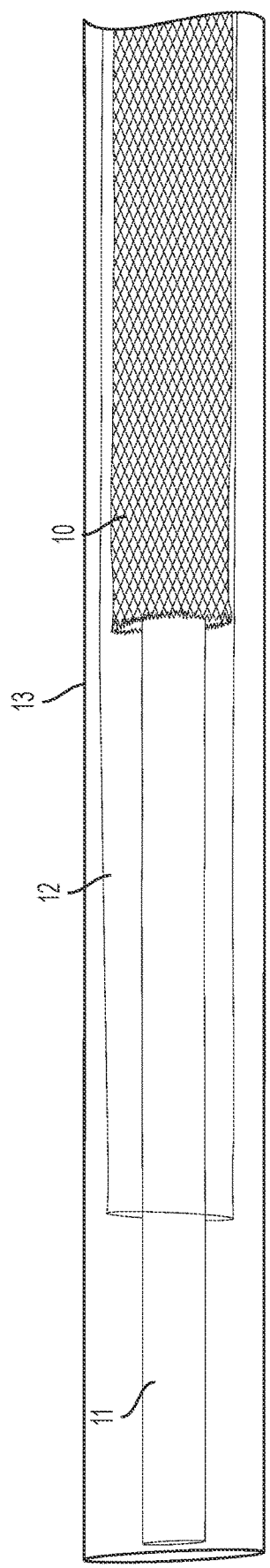
FIG. 1G shows an exemplary rigid mold that the forming sleeves and reinforcement sleeve can be inserted into in accordance with the present invention.

One end of the two forming sleeves 11 and 12 is designated the inlet end 15 and the other the outlet end 16. Reinforcement sleeve 10, which comprises a reinforcement material such as fiberglass, is placed between the two forming tubes in the area where the finished tubing is to be generated. In some embodiments, the reinforcement sleeve 10 begins a generally flexible tubular sleeve, and as shown in FIG. 1B initially the inner sleeve 11 is placed into the cavity of reinforcement sleeve 10. As such, the reinforcement sleeve 10 surrounds the outer of the inner sleeve 11 such that the two are concentric and axially aligned. Next, as shown in FIG. 1C, the outer sleeve 12 is placed over and around the reinforcement sleeve 10, forming a three layer axially aligned combination wherein the reinforcement sleeve 10 is disposed between the inner sleeve 11 and the outer sleeve 12. Close-ups of this arrangement are shown in FIGS. 1D and 1E and a cross section of this arrangement is shown in FIG. 1F. In some embodiments, the inner and outer forming sleeves 11 and 12 are somewhat longer than the reinforcement sleeve 10 in order to provide additional working material for the resign impregnation process described herein. Additionally as shown in FIG. 1G, in some embodiments, the outer sleeve 12 may be encapsulated by an external rigid mold 13, which can be used to shape and dimension the final product as desired.

With reference to FIGS. 2A-2E, the resin impregnation process is shown. A first piston 21, which, in some embodiments, comprises an elastic spheroid with an outside diameter slightly larger than the internal section or diameter of the outer forming sleeve 12 is introduced into the inner sleeve 11 at the inlet end 15. See FIG. 2A.

To start the process, the first piston 21 is inserted into the inner sleeve 11 to a point just before or at the first end of the reinforcement sleeve 10. See FIG. 2B. Next, a predetermined amount of liquid or semi-liquid resin 22 is introduced between the inner and outer sleeves 11 and 12. In some embodiments, this is accomplished through injection or other application means. In some embodiments, the volume of resin 23 is sufficient to fill the void between the inner and outer sleeves 11 and 12 from the inlet end 15 of the arrangement to the location of the first piston 21. Then, a second piston 23, which may have the same form and material qualities as first piston 21, is then introduced into the inner forming sleeve 11, thereby sealing the volume of resin 22 between the inner and outer forming sleeves 11 and 12 due to the compression of the outside shape or diameter of the pistons 21 and 23, effectively sealing any gap between the inner and outer forming sleeves 11 and 12. See FIG. 2C.

Next, a motive fluid pressure such as air pressure provided, for example by way of a compressed air source, is applied to the inlet end 15 of the inner forming sleeve 11. This pressure acting on the second piston 23 causes it to translate along the inside of the inner sleeve 11. Since the volume between the pistons is sealed and separated by the volume taken by the resin used, both pistons 21 and 23 translate along the inner sleeve 11. The pressure between the two pistons 21 and 23 further causes the resin between the two forming sleeves 11 and 12 to distribute into and around the reinforcement. This is shown in FIG. 2D. In some cases, as the pistons enter the area containing the reinforcement sleeve 10 they are distorted to a smaller form or diameter. In any event, the pistons 21 and 23 continue to move along the inside the inner forming sleeve 11 until both pistons have passed the end of the reinforcement sleeve 10. Accordingly, as a result of the action of the pistons 21 and 23, the resin 22 is uniformly applied to reinforcement sleeve 10. Once the pistons 21 and 23 have passed the reinforcement sleeve 10, a clamp means 24 is attached at the inlet and outlet end 15 and 16 of the arrangement in order to seal the arrangement and retain the pressure inside the inner sleeve 11 once the fluid pressure is removed. See FIG. 2E.

Figure 2A:
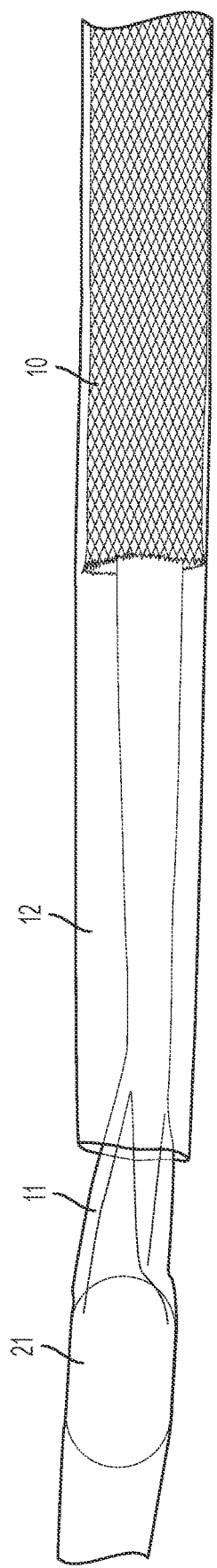
FIG. 2A shows a step of the present method wherein the first piston is inserted into the inner sleeve.
Figure 2B:
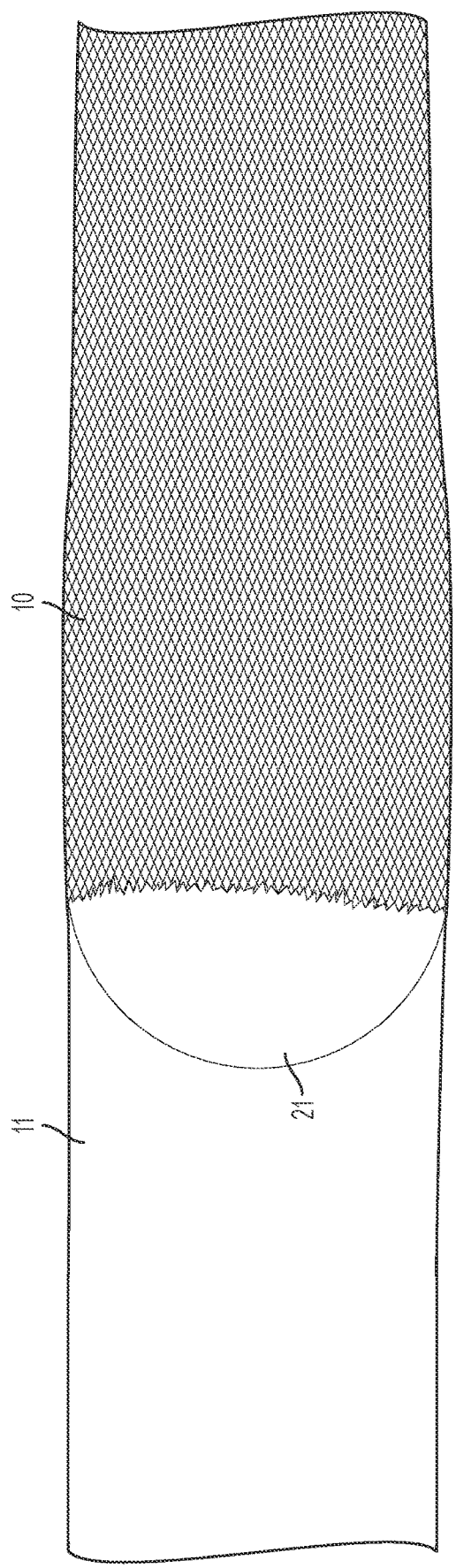
FIG. 2B shows a step of the present method wherein the first piston is positioned at a first end of the reinforcement sleeve.
Figure 2E:
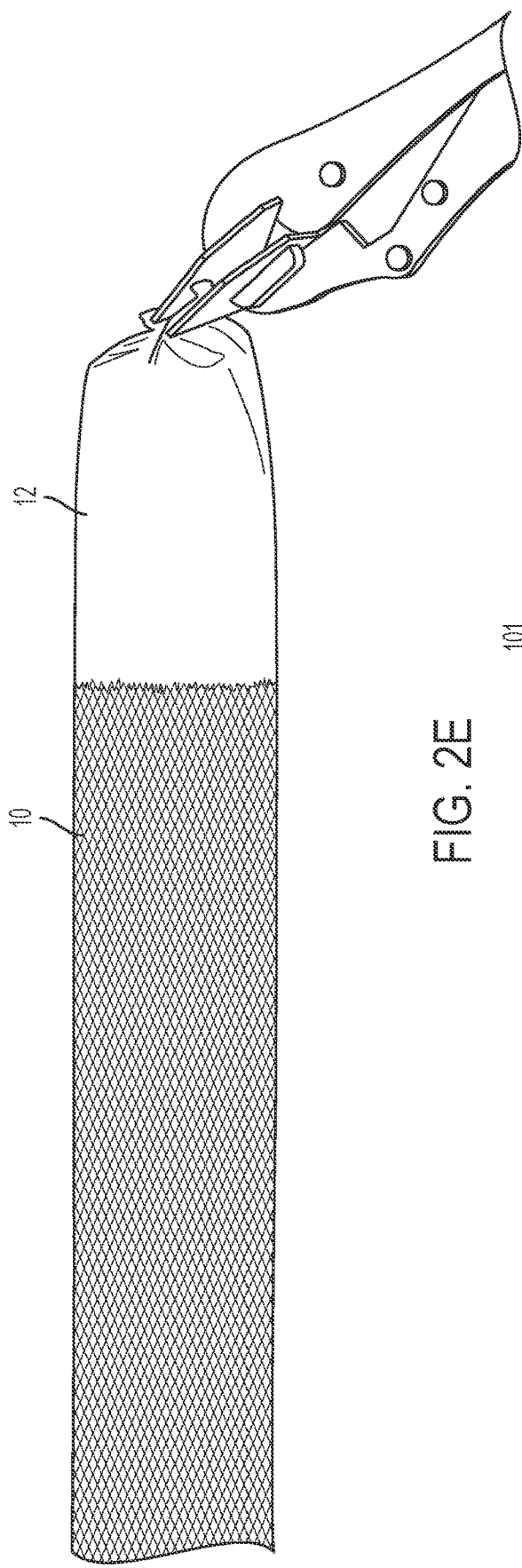
FIG. 2E shows a step of the present method wherein the ends of the arrangement are clamped in order for the sleeves to remain air tight.
Figure 2F:
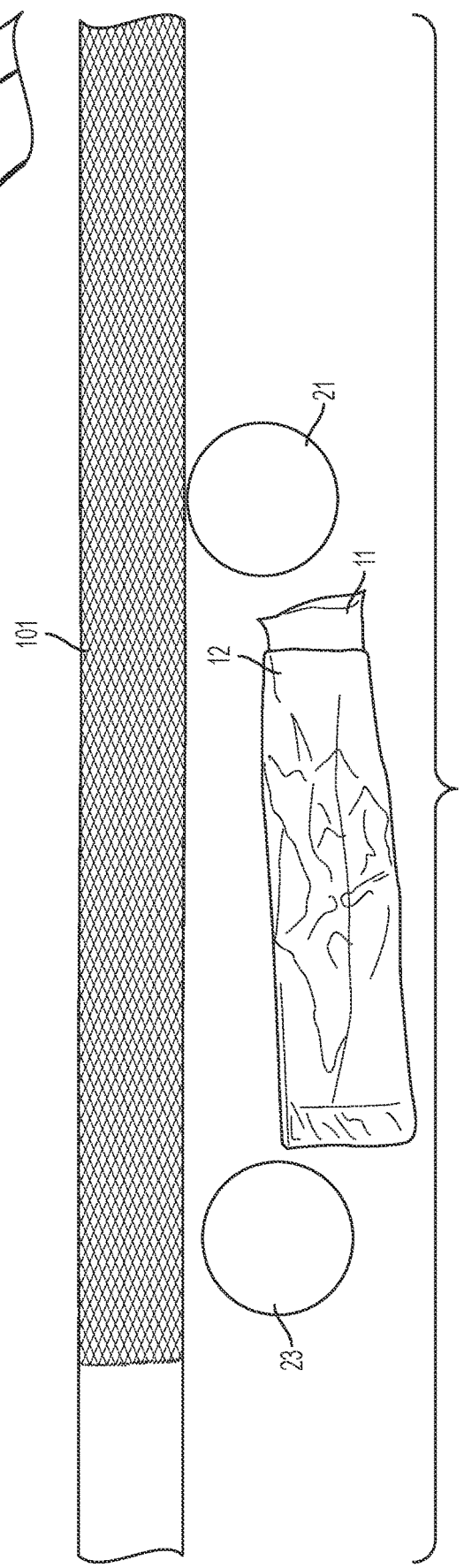
FIG. 2F shows a step of the present method wherein the pistons and sleeves are removed, leaving the resultant composite laminate final product.

After the resin 23 has been transferred and impregnated into the reinforcement sleeve 10, the resultant composite laminate is cured by normal means such as, but not limited to, applying heat in any form to the composite, or alternatively by exposes the composite to ultraviolet radiation and/or room temperature curing, depending on the chemical makeup of the resin and reinforcing material. Following curing, the inner and outer sleeves 11 and 12 and the pistons 21 and 23 can be removed leaving the resultant composite laminate tubing 101, as shown in FIG. 2F.

Figure 3:
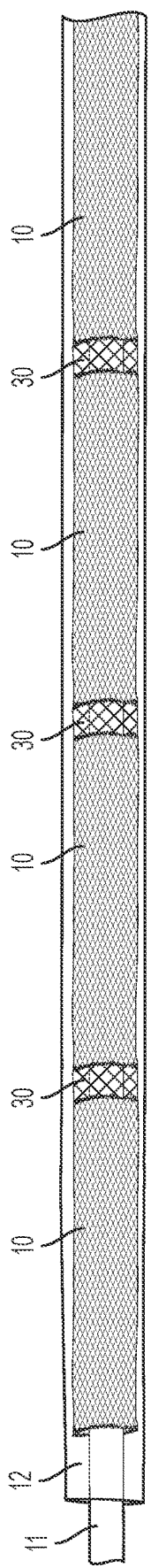
FIG. 3 shows a step of the present invention where in additional reinforcement material is layered onto the reinforcement sleeve at spaced apart positions in order to increase the thickness of the resultant product at predetermined locations.

The above methodology describes the process for manufacturing straight or curved pipe or tubing with constant or variable external sections or diameters, which can be created by the use of an external rigid mold 13 that provides the desired shape. However, in other embodiments, by selective initial loading of reinforcement material into the forming sleeves 11 and 12 at desired positions, the resultant conduit, tubing, or pipe can be molded internally with areas of differing designated wall thicknesses to take account of any functional or strength considerations without affecting its external section or diameter. For example, additional sections or layers of reinforcement material can be laid over the reinforcement sleeve 10 at desired locations. Such an example is shown in FIG. 3, wherein additive reinforcement material 30 is added at spaced apart points along the length of the reinforcement sleeve 10. The above described resin impregnation method is carried out in substantially the same manner to provide the desired final product.

Based on the foregoing, the present invention provides a method of manufacturing and a process of manufacturing conduit, tubing, or pipe of any desired shape and dimension from a composite material such as fiberglass or other resin impregnated material. The provision of the elastic pistons in to the inner sleeve provides uniform and controllable impregnation of the resin such that the resultant final product has improved consistency and material characteristics. Additionally, the flexible inner and outer sleeves improve the ease of manufacturing and allow the process to be easily carried out inside a mold of any desired shape. It may be appreciated by one with skill in the art that the terms tubing, conduit, pipe, or piping can be used interchangeably to refer to the generally elongated cylindrical members that the present method is useful for manufacturing. In any event, the method can be used to manufacture composite materials of other shapes and sizes depending on the use of molds or other means that would not otherwise depart from the spirit and scope of the methodology disclosed herein.

While specific embodiments have been described in detail, those with ordinary skill in the art will appreciate that various modifications and alternatives to those details could be developed in light of the overall teachings of the disclosures. Accordingly, the particular arrangements disclosed are meant to be illustrative only and not limiting of the invention, which is to be given the full breadth of the appended claims, and any and all equivalents thereof.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for manufacturing composite tubing, comprising:
    providing an inner sleeve, an outer sleeve, and a reinforcement sleeve;
    inserting said inner sleeve into said reinforcement sleeve;
    placing said outer sleeve around said reinforcement sleeve;
    inserting a first piston into an inlet end of said inner sleeve;
    introducing resin between said inner and outer sleeves;
    inserting a second piston into said inlet end of said inner sleeve;
    applying motive fluid pressure at said inlet end of said inner sleeve, causing said second piston to translate along said inner sleeve, further causing said first piston to translate along said inner sleeve;
    whereby translation of said first and second pistons along said inner sleeve causes said resin to be impregnated into and around said reinforcement sleeve.

2. The method of claim 1, further comprising the step of continuing to apply motive fluid pressure at said inlet end of said inner sleeve until said first and second pistons pass an outlet end of said inner sleeve, beyond said reinforcement sleeve.

3. The method of claim 2, further comprising the step of, after said first and second pistons pass said outlet end of said inner sleeve, clamping said inner and outer sleeves to retain pressure inside said inner sleeve.

4. The method of claim 3, further comprising the step of curing said resin and said reinforcement sleeve to form said composite tubing.

5. The method of claim 4, further comprising the step of removing said inner and outer sleeves from said composite tubing.

6. The method of claim 1, wherein said first and second pistons comprise an elastic material.

7. The method of claim 6, wherein said first and second pistons are generally spherical.

8. The method of claim 1, further comprising the step of providing a mold around said outer sleeve to shape and form said composite tubing.

9. The method of claim 1, wherein said inner and outer sleeves are longer than said reinforcement sleeve.

10. The method of claim 9, wherein, prior to said step of introducing resin, said first piston is inserted into said inner sleeve to a location just before a first end of said reinforcement sleeve.

* * * * *